United States Patent [19]

Baars

[11] 4,328,903
[45] May 11, 1982

[54] WEATHERPROOF JUNCTION BOX

[76] Inventor: George J. Baars, 18 Wimpole Way, Green Brook, N.J. 08812

[21] Appl. No.: 125,759

[22] Filed: Feb. 29, 1980

[51] Int. Cl.³ .............................................. H02G 3/08
[52] U.S. Cl. ........................................ 220/3.7; 174/58; 220/3.9; 248/27.1; 248/360; 248/DIG. 6
[58] Field of Search .......................... 220/3.3, 3.9, 2.2; 174/58; 248/DIG. 6, 27.1, 293, 360, 359; 85/36

[56] References Cited
U.S. PATENT DOCUMENTS

| 2,423,757 | 7/1947 | Dedge | 248/DIG. 6 |
| 3,187,084 | 6/1965 | Stillman et al. | 174/58 |
| 3,197,548 | 7/1965 | Weitzman | 220/3.3 X |
| 3,326,509 | 6/1967 | Kuttler | 85/36 X |
| 3,659,036 | 4/1972 | Silver | 174/58 |
| 3,796,124 | 3/1974 | Crosa | 85/36 |
| 3,884,441 | 5/1975 | Barry | 248/DIG. 6 |

FOREIGN PATENT DOCUMENTS

| 1058517 | 3/1954 | France | 174/58 |
| 135847 | 5/1979 | German Democratic Rep. | 174/58 |

Primary Examiner—Allan N. Shoap
Attorney, Agent, or Firm—Carella, Bain, Gilfillan & Rhodes

[57] ABSTRACT

A weatherproof junction box is disclosed to include mounting means comprising lugs rotatably mounted on posts integral with the box structure and secured thereto by push nuts.

8 Claims, 4 Drawing Figures

WEATHERPROOF JUNCTION BOX

BACKGROUND OF THE INVENTION

This invention relates to junction boxes. More specifically, this invention relates to weatherproof junction boxes of the type which are intended to be used out of doors and which are structured to permit one or more electrical wires to pass through the box walls into the interior cavity of the box while maintaining the weatherproof integrity of the box.

The increased use of exterior lighting and the desirability of providing permanently installed electrical service exterior to building structures generated a need for the utilization of exteriorly mounted junction boxes.

The initial approach to provision of such junction boxes contemplated the utilization of holes formed in the junction box walls to secure the junction box to a support means. This was found to be unacceptable because the holes in the junction box walls violated the weatherproof integrity of the box, thus giving rise to short circuiting and other undesirable electrical difficulties.

Recognizing this problem, those skilled in the art undertook design activity which was intended to provide functional mounting structures for exterior junction boxes while at the same time preserving the weatherproof integrity of the box. One example of such an approach is found in U.S. Pat. No. 3,197,548 to Weitzman, et al. wherein there is disclosed a junction box having slots formed in the exterior edges which are designed to receive mounting tabs therein. The tabs are provided with bent sections at a 45° angle and, when such bent sections are inserted in the slots, provide outwardly extending tabs suitable for mounting the box on a support structure. Although the Weitzman junction box structure provides for mounting means wherein the weatherproof integrity of the box is retained, those skilled in these arts have found that its basic design is the source of a plurality of difficulties. Not the least of these is that such boxes are manufactured by die casting aluminum and the requirement for slots in the junction box structure presents a need for additional manufacturing steps subsequent to casting, thus increasing the cost of manufacturing and therewith the ultimate cost of the box. Secondly, such slots, particularly in view of the fact that the boxes are manufactured from aluminum, are subject to damage by deformation of the box material which may render the slot incapable of satisfactory use or which requires additional corrective steps at the time of assembly for installation. Such rework also is a source of increased cost. Thirdly, by reason of the fact that the mounting tabs are not secured to the box structure during manufacture, there is the continuing likelihood that the tabs will be inadvertently omitted at the factory, lost during shipment or lost on the job site prior to installation. Anyone who has experienced such loss is aware of the attendant frustration and lost time. Thus, the Weitzman, et al. junction box, while solving one problem gives rise to a number of additional problems which render the design unacceptable to many in this field.

A second and probably more advanced approach to the problem is shown in U.S. Pat. No. 3,187,084 to Stillman, et al. This patent discloses a weatherproof junction box wherein provision is made for securing the box to support structure by the utilization of lug means mounted in channels formed in the exterior surface of the back wall of the box which lugs are secured to the box structure through the use of screws in threaded engagement with tapped bores provided in the box structure. The channels in the back wall of the box are shaped such as to permit reception of the lug means within the basic dimensions of the box so as to accommodate for shipment and storing in the optimum size container. When it is desired to utilize the box at the job site, the mounting screws for the lugs must be loosened, the lugs rotated from stored position to mounting position and the screws thereafter tightened for retaining the lugs in their securing position. The disadvantages of this structure are clear. Initially, the manufacturing operation requires the provision of a plurality of tapped holes each of which requires a machining operation thus adding to the attendant cost of the product. Additionally, with respect to manufacture, the lugs must be assembled by positioning and threadedly engaging the screws within the tapped bores. This also requires a plurality of individual manufacturing operations, all of which add to the cost of the product. Still further, the onsite necessity of unscrewing the lug securing means, rotating each lug into an operating position and thereafter tightening the screws are additional steps in the utilization of the structure which add to overall cost and are thus undesirable.

SUMMARY OF THE INVENTION

It is an object of the present invention, therefore, to provide a junction box structure suitable for outdoor use in which the basic junction box structure is a die cast structure which does not require additional machining to provide for the incorporation of mounting structure.

Another object of the present invention is to provide a junction box suitable for outdoor use which utilizes no threaded connections incidental to the assembly of its mounting structure.

A further object of the present invention is to provide a junction box suitable for outdoor use wherein the mounting structure of the box is permanently affixed to the box structure during factory assembly whereby to preclude loss of mounting elements during shipment or on the job site.

Yet an additional object of the present invention is to provide a junction box suitable for outdoor use with respect to which no disassembly and reassembly are required on the job site incidental to preparing the box for mounting.

Still a further object of the present invention is to provide a junction box suitable for outdoor use wherein mounting lugs are rotatable through a plurality of positions without disassembling the structure and to permit a broad range of mounting configurations.

These objects and others not enumerated are achieved by the junction box according to the present invention, one embodiment of which may include a housing having bottom, top, side and back walls defining a cavity, at least one of the walls having a threaded opening therethrough, a plurality of posts formed on the external surface of the back wall, lug means rotatably received on the post and secured thereto by push nuts.

BRIEF DESCRIPTION OF THE DRAWINGS

A more complete understanding of the present invention may be had from the following detailed description thereof particularly when read in the light of the accompanying drawings, wherein.

DETAILED DESCRIPTION OF THE INVENTION:

As noted above, this invention relates to junction boxes. More specifically, this invention relates to weatherproof junction boxes of the type which are intended to be used out of doors.

Figure 1:
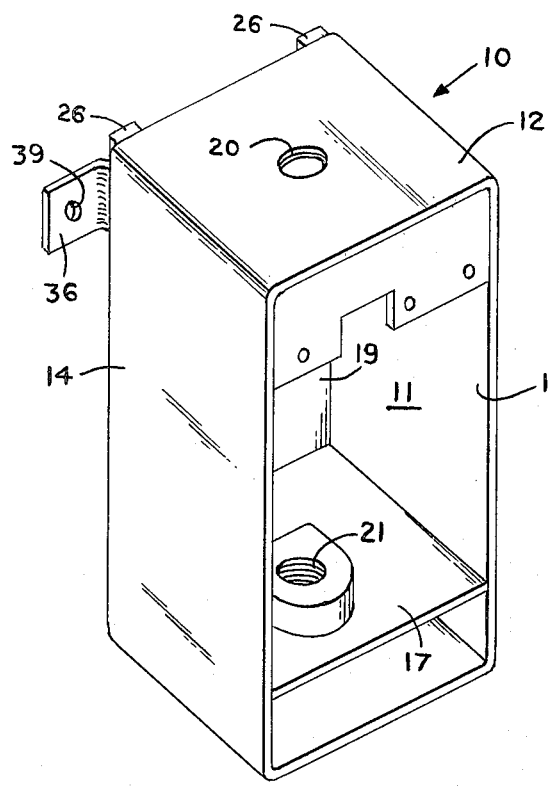
FIG. 1 is a perspective view of a junction box structured in accordance with the present invention.
Figure 2:
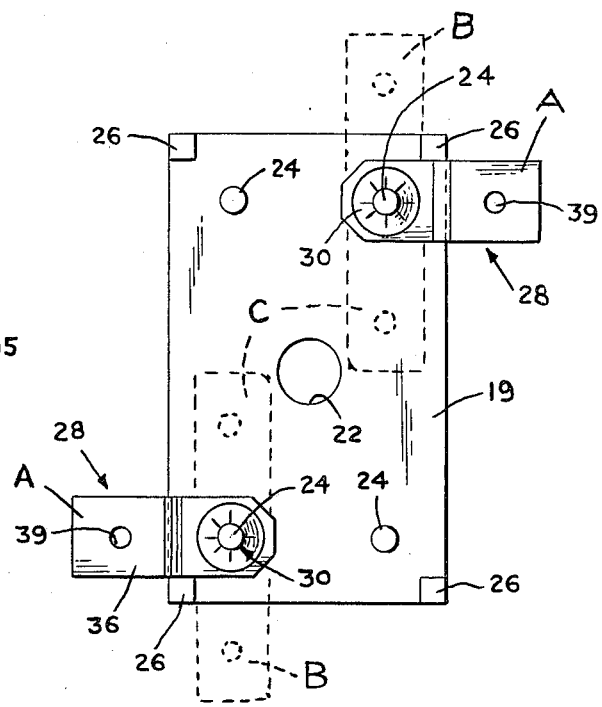
FIG. 2 is a rear elevational view of a junction box structured in accordance with the present invention.
Figure 3:
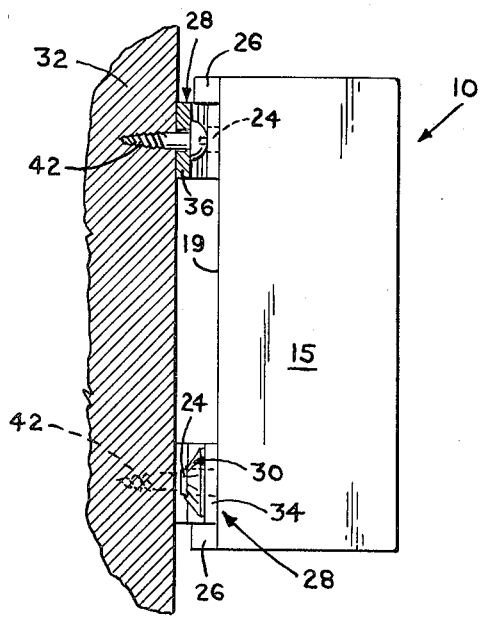
FIG. 3 is a side elevational view of a junction box structured in accordance with the teaching of the present invention.

Referring, therefore, to FIGS. 1 through 3, there is shown a junction box structured according to the present invention and designated generally by the reference numeral 10.

Junction box 10 comprises a unitary housing 11 which may be die cast of aluminum or the like. Housing 11 includes a top wall 12, a first side wall 14, a second side wall 15, a bottom wall 17 and a back wall 19. Formed centrally axially through top wall 12 is a threaded throughbore 20. Similarly, formed centrally through bottom wall 17 is a threaded throughbore 21. Similarly, extending through back wall 19 is a threaded throughbore 22. Threaded bores 20, 21 and 22 are provided to accommodate the well known fittings for receiving electrical wire incidental to the function of junction box 10.

Formed integrally with the structure of housing 11 and extending outwardly from the exterior surface of back wall 19 are a plurality of posts 24 and corner stops 26. More specifically, corner stops 26 are disposed at the four corners of back wall 19. Posts 24 are disposed adjacent corner stops 26 but generally inwardly from the edges of back wall 19.

As best may be seen in FIG. 2, posts 24 define pivot supports for lugs 28 which are utilized to secure junction box 10 to a support structure, e.g. wall 32 as best may be seen in FIG. 3.

Figure 4:
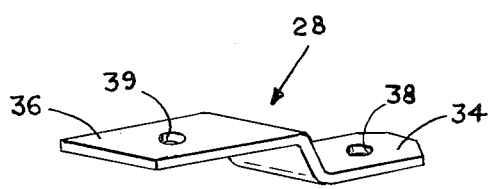
FIG. 4 is a perspective view of a mounting lug utilized in conjunction with the junction box of the present invention.

Referring to FIG. 4, there is shown a lug 28 which can be seen to comprise a bar element having a first section 34 and a second section 36, the planes of sections 34 and 36 being generally parallel but slightly displaced one from the other. As will be discussed in detail below, the displacement distance between the upper surface of first section 34 and the lower surface of second section 36 is substantially equal to the height of posts 24 on back wall 19. Additionally, first section 34 is provided with a through bore 38 in generally the same manner as second section 36 is provided with a through bore 39. Through bores 38 and 39 are of a diameter which is substantially equal to the diameter of posts 24 so as to be rotatably receivable on posts 24 incidental to the assembly of junction box 10.

Referring again to FIG. 2, there are shown two lug members 28 which are rotatably mounted on posts 24 and which are secured thereto by push nuts 30. More specifically, in assembling junction box 10, lugs 28 are positioned such that either bore 38 or bore 39 of lug 28 is rotatably received on posts 24. Thereafter, push nuts 30 are pushed on to posts 24 whereby to retain the lugs on the posts.

It is recognized that those skilled in these arts may be somewhat surprised by the use of push nuts in this structure. Traditionally such hardware has not been considered to be structurally satisfactory for use in conjunction with junction boxes. It has been found, however, that for purposes of retaining lugs such as lugs 28 on structures such as junction box 10 that the push nuts are not only acceptable structurally but highly desirable by reason of their ease of utilization with attendant economies.

As best can be seen from FIG. 2, lugs 28 are rotatable about posts 24 between either of two operating positions shown as Positions A and B in FIG. 2 and a stored or shipping position shown as Position C in FIG. 2. More specifically, it will be recognized by those skilled in these arts that it is desirable to contain mounting lugs for junction boxes within the basic confines of the overall junction box structure such as to minimize the size of package which must be utilized to stock and ship the junction boxes. In this regard lugs 28 are rotatable selectively from the stowed position shown as Position C in FIG. 2 to the operating positions shown as Positions A and B in FIG. 2 merely by causing their rotation with ordinary manual power. It should be noted, however, that the lugs are restrained against total rotation by the corner stops 26 disposed on the back wall 19 of the junction box. Such corner stops serve not only as rotation limiting elements but also as guides. Thus, rotation of a lug from the stored position to the operating positions such as to be in contact with corner stops 26 also effects positioning of the lugs in the desired position for installation.

Installation of the junction box is extremely simple. It is merely necessary to rotate the two active lugs outwardly of the junction box from the stowed position shown in FIG. 2 to the active positions shown in FIG. 2 and thereafter causing the junction box to be secured to the adjacent structure through the use of securing means such as screws 42 extending through holes 39 (FIG. 2) or 38 (FIG. 4) depending upon how lugs 28 are mounted. In this regard, proper mounting of lug 28 causes the surface of lug 28 to be in surface-to-surface contact with the exterior surface of back wall 19 and the second portion of lug 28 to be disposed generally away from the plane of back wall 19 in a direction away from the surface of back wall 19.

As noted above, the displacement of the surfaces of first and second sections 34 and 36 in substantially equal to the depth of posts 24. Thus, by positioning one section rotatably on a post 24 and further positioning the lug 28 such that it is displaced rearwardly from the back wall 19 of junction box 10, the planes of the lug sections cooperate with the distal surfaces of posts 24 to define a single plane which, when box 10 is mounted such as shown in FIG. 3 becomes effectively the plane of the wall on which the junction box is mounted.

It can be seen from the foregoing detailed description, therefore, that mounting lugs 28 are positionable on the structure of junction box 10, i.e. posts 24 without the requirement for any special machining or similar expensive manufacturing steps such as have been required in the prior art. Further, there is no threaded engagement necessary for securing mounting lugs 28 to the structure of junction box 10 either at the time of assembly during manufacture or thereafter on a job site at the time of installation. Additionally as many as four lugs may be provided if the mounting requirements so demand.

The housing 11 of junction box 10 may, as has been done in the past, be manufactured by die casting and using materials such as aluminum or the like. Other specific fittings for accommodating the mounting of electrical elements which are shown pictorially in FIG. 1 but not described in detail may be accommodated within the junction box cavity utilizing any of the many known techniques in these arts.

Thus, the junction box according to the present invention constitutes a structure which is less expensively manufactured than the prior art devices, which is as easy to install as any prior art device and which accommodates convenient shipping.

An additional economy is that the 270° rotation range of the mounting lugs permits an inventory of a single junction box style which may be used in applications requiring horizontally oriented lugs, vertically oriented lugs, or combinations thereof.

Finally, the resilient nature of the push nuts can be expected to provide a degree of shock and vibration clamping which is not available in known box structures.

The clear advantages available to the structure should be recognized immediately by those skilled in these arts. Additionally, those skilled in these arts will also recognize that many modifications and variations may be made to the preferred embodiment disclosed without departing from the spirit and scope of the invention.

I claim:

1. An electrical junction box comprising:
   a housing having bottom, top, side and back walls for defining a cavity;
   at least one of said bottom, top, side and back walls having a threaded opening therethrough;
   a plurality of posts formed on the external surface of the back wall;
   lug means for mounting said box to a support, said lug means rotatably received on said plurality of posts; and
   push nut means rigidly secured to said posts for retaining said lug means on said posts.

2. Apparatus according to claim 1 wherein said lug means comprise elongated straps, said straps being formed to define a first portion in a first plane and a second portion in a second plane, said second plane being displaced from said first plane.

3. Apparatus according to claim 2 wherein said first plane is substantially parallel to said second plane.

4. Apparatus according to claim 3 wherein the distance by which said second plane is displaced from said first plane is substantially equal to the length of said posts.

5. Apparatus according to claim 2 wherein the distance by which said second plane is displaced from said first plane is substantially equal to the length of said posts.

6. Apparatus according to claim 2 including stop means formed on the external surface of said back wall, said stop means for limiting the degree of rotation of said lug means about said posts.

7. Apparatus according to claim 1 including stop means formed on the external surface of said back wall, said stop means for limiting the degree of rotation of said lug means about said posts.

8. Apparatus according to claim 7 wherein the distance by which said second plane is displaced from said first plane is substantially equal to the length of said posts.

* * * * *